Dec. 12, 1939.    J. EVANS    2,182,982
FOUR-WAY VALVE MECHANISM
Filed Oct. 30, 1937    2 Sheets-Sheet 1
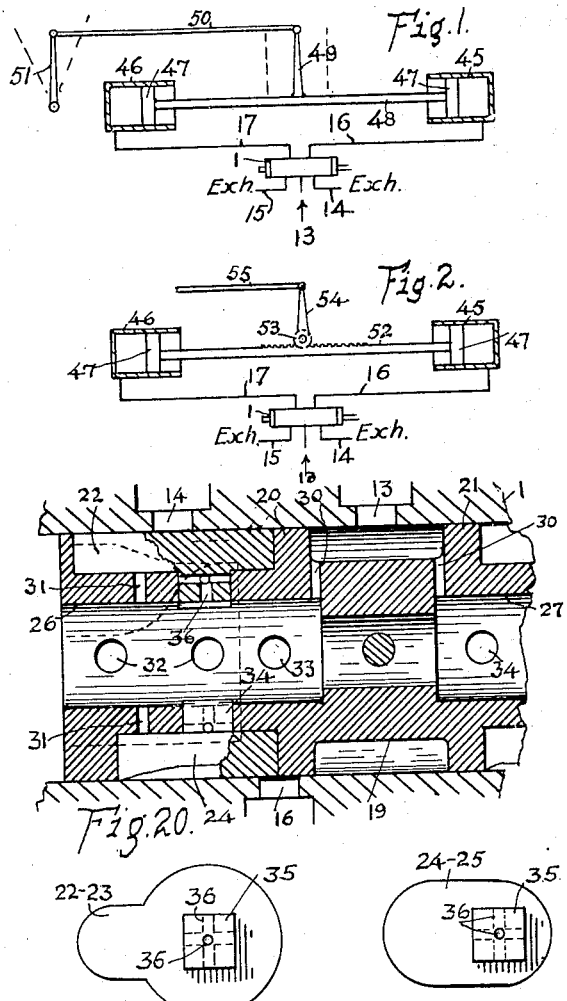
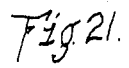
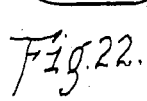
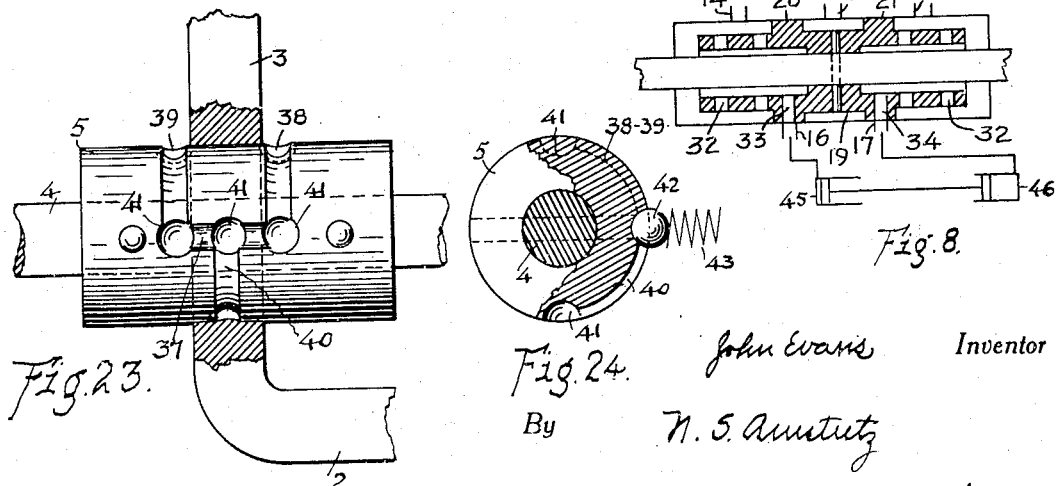
John Evans, Inventor
By N. S. Amstutz, Attorney Dec. 12, 1939.  J. EVANS  2,182,982
FOUR-WAY VALVE MECHANISM
Filed Oct. 30, 1937   2 Sheets-Sheet 2
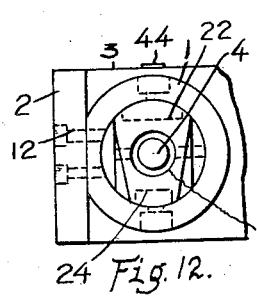
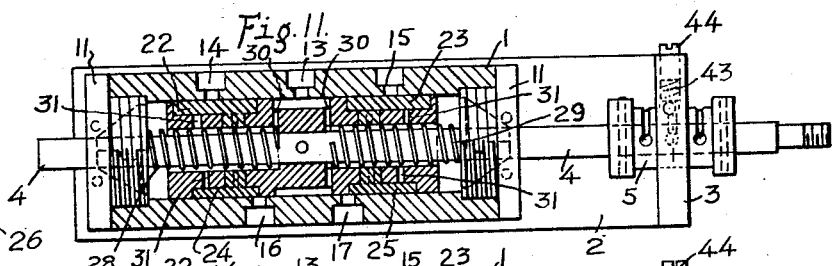
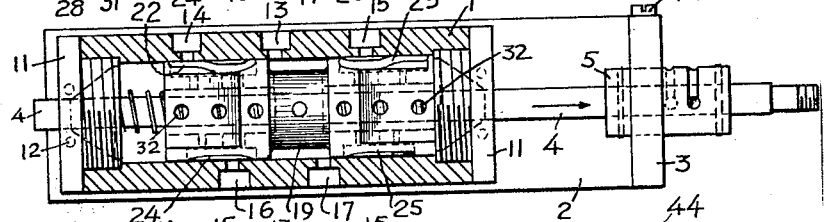
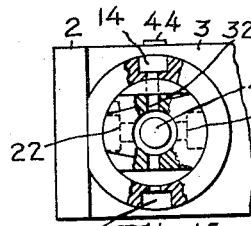
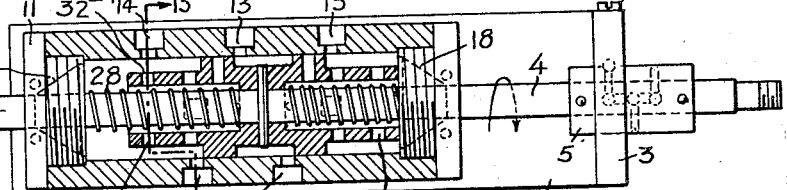
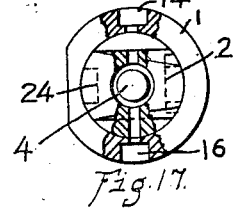
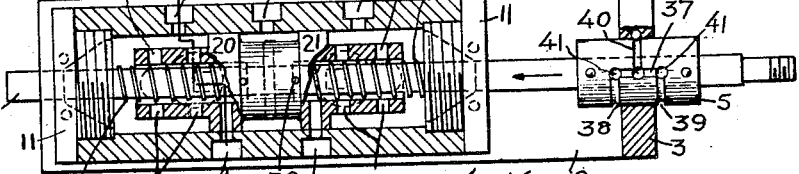
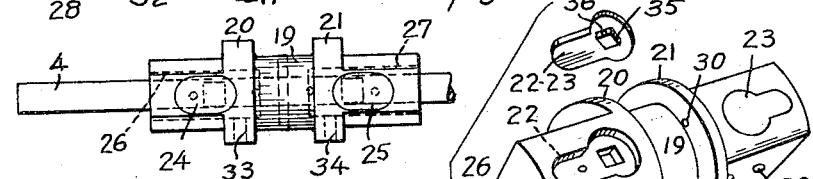
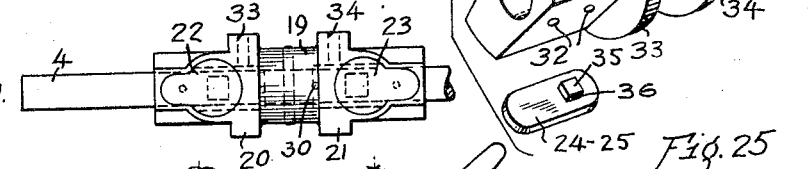
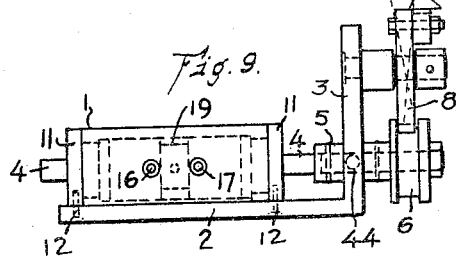
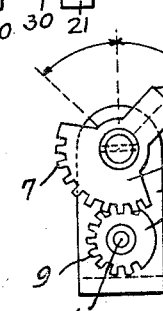
John Evans Inventor
By N. S. Amstutz
Attorney Patented Dec. 12, 1939

2,182,982

UNITED STATES PATENT OFFICE 2,182,982

FOUR-WAY VALVE MECHANISM

John Evans, Indiana Harbor, Ind.

Application October 30, 1937, Serial No. 171,865

3 Claims. (Cl. 121—46.5)

My invention relates to improvements in four-way valve mechanism and it more especially consists of the features pointed out in the annexed claims.

The purpose of my invention is to provide a single valve mechanism that may be used to produce six separate functions according to different positions when rocked on its axis, moved lengthwise of the axis or combinations of such positional changes.

It is also a purpose of my invention to adapt my four-way valve to effectively and definitely control variable positions of any mechanism, through liquid or air pressure, that may need to be moved variably in one direction and at the same time be positively and reciprocally opposed so as to hold the mechanism such as a single bar in an infinite number of positions between the extremes of its traverse. As an example or instance of adaptation one may assume a bar having a piston at each end and a separate cylinder for each piston. The center of the bar or at a point midway of its ends has a lateral projection adapted to be connected to any mechanism which must be variably controlled without any wavering whatever.

The interaction of the cylinders under the control of my four-way valve is such that as the pressure in one moves the piston outward the pressure in the other one is reciprocally opposed to positively hold the bar, slowly moving, rapidly moving or at rest at any point between the extremes of its to and fro movement. Whether the bar moves slowly or fastly or is standing still it is always held by a reciprocal pressure or force at each end. As the force in one cylinder is increasing the opposing force in the other cylinder is correspondingly decreasing. If the bar is to remain stationary at any point the pressure in the cylinders is always reciprocal. In this way, regardless of the work that the projection from the bar must do the bar is, as stated above, held under absolute control at all times.

An alternative to the projection from the bar would be if the bar simulated a toothed rack which meshed with a pinion that was connected to a shaft which should be moved around its axis in an oscillatory manner or be held at rest.

With these and other ends in view I illustrate such instances of adaptation as will disclose the broad underlying features of the invention without limiting myself to the specific details shown thereon and described herein.

Fig. 1, sheet 1, is a diagrammatic view showing my control associated with a pair of cylinders and a lever connection to the piston rod which connects the pistons in the cylinders.

Fig. 2 is a similar diagrammatic view to Fig. 1 showing a rack and pinion adaptation.

Fig. 3 is a diagrammatic view, partly in section, showing the valve in its mid or neutral position, when the pistons are central in their cylinders.

Fig. 4 is a diagrammatic view, partly in section, similar to Fig. 3 showing the valve in the extreme right end position within its casing.

Fig. 5 is also a diagrammatic view, partly in section, showing the valve in its extreme right hand end position and turned on its axis 90° from the position shown in Figs. 3 and 4.

Fig. 6 is a diagrammatic view, in elevation, of the valve of Figs. 3 and 4 moved to its extreme left hand end position.

Fig. 7 is a diagrammatic view, partly in section, of the Fig. 5 valve, but shifted to the left hand end of the casing.

Fig. 8 is a diagrammatic view, partly in section, showing the valve of Fig. 7 in mid-position and turned on its axis 180° away from the Fig. 7 axial position and 90° from the Fig. 1 axial position.

Fig. 9, sheet 2, is a side elevation of my four-way valve with its operating lever etc.

Fig. 10 is an end elevation of Fig. 9.

Fig. 11 is a top plan view, in section, of the valve in its casing in the same mid-position as in Fig. 3.

Fig. 12 is a left hand end view of Fig. 11, with the end cap of the casing removed.

Fig. 13 is a top plan view of the valve of Fig. 11 moved to the extreme right.

Fig. 14 is a top plan view in section showing the valve of Fig. 13 turned 90° on its axis.

Fig. 15 is an end elevation, partly in section, on line 15—15 of Fig. 14.

Fig. 16 is a top plan view, in section, with the valve in mid-position similar to Fig. 1, but turned 90° on its axis.

Fig. 17 is an end view, partly in section, on line 17—17, of Fig. 16.

Fig. 18 is a detached view of the valve removed from its casing, in the axial relation as Fig. 16.

Fig. 19 is a detached view similar to Fig. 18 showing the valve turned on its axis 180°.

Fig. 20, sheet 1, is an enlarged section of the left hand end of the valve and adjacent parts of the casing.

Fig. 21 is a bottom plan view of a large closure for the exhaust casing openings.

Fig. 22 is a bottom plan view of a small closure for the openings of the casing leading to the cylinders.

Fig. 23 is an enlarged elevation of the control for positioning the valve endwise and in rotation on its axis.

Fig. 24 is an end elevation of the valve positioning sleeve of Fig. 23.

Fig. 25 is a perspective view of the valve and partially dissembled parts.

In practicing my invention I may use whatever alternatives or equivalents of construction that the exigencies of varying conditions may require without departing from the broad spirit of the invention.

Two adaptations are illustrated in Figs. 1 and 2. A pair of cylinders 45 and 46 are placed in axial alignment. In the cylinders, pistons 47 are located. These pistons are connected by piston rods 48 or 52 so that they always move together as a unit. The piston rods 48 and 52 may be connected to any desired mechanism, the movements of which are to be variably and positively controlled. In Fig. 1 the rod 48 has a projection 49 to which a link 50 may be connected so as to actuate the pivoted arm 51 and at the same time selectively and definitely determine the positions the arm and any attached mechanism shall assume at the will of the operator. A modification of Fig. 1 is shown in Fig. 2. In this the piston rod 52 may have threads formed around it to serve as a toothed rack so as to actuate a pinion 53. The shaft of this pinion may have an arm 54 attached to it and on the outer end of this arm a link 55, similar to the link 50 of Fig. 1 may be attached.

The cylinder 45 is connected to the opening 16 of the valve casing 1 and the cylinder 46 is similarly connected to the opening 17 of the same casing. The valve casing consists of a tube 1 that is closed at both ends by screw caps 11. These caps have a conical recess on their inner faces in which sectional packings 18 are seated. A spindle or shaft 4 passes through the caps or heads 11 and the packings 18 loosely. At the right hand end of Fig. 9 the shaft 4 has secured thereon a sleeve 5 which through grooves in its cylindrical surface defines the different changes of the shaft 4, lengthwise and rotarily. The sleeve 5 is pinned to the shaft 4 but it has endwise and rotative movement in the upstanding projection 3 of the base 2 on which the casing 1 is secured by screws 12 that pass into the threaded heads 11.

The shaft 4 is moved lengthwise by a rocking segment 8 that is tiltable on its pivot as shown by dotted lines on Fig. 9. The teeth 7 of the segment engage the teeth 9 of an incomplete pinion 6. This pinion is secured to the shaft 4 so as to rock it around its axis as the toothed pinion 6 is moved. It has a projecting flange on each face between which the segment is positioned and because of these flanges the shaft, with its pinned on valve is moved endwise as the segment is tilted to the right or the left.

The sleeve 5 has a lengthwise groove 37. From this groove a short circumferential groove 40 descends and two similar grooves, one to the left 38 and one 39 to the right of the groove 40 ascend. These grooves comprise the means for controlling the various positions of the shaft 4 and its attached valve. At the end of each one of the grooves 37—40 inclusive there is a deeper depression 41. A similar depression is also formed at the intersection of the grooves 37 and 40. These depressions in cooperation with a ball 42 under pressure of the spring 43 serve to definitely define the neutral or central position of the sleeve. The extreme positions are determined by the depression 41 at the end of the groove 40, depressions 41 at the ends of the groove 37 and similar depressions at the ends of the grooves 38 and 39. A screw 44 permits a change of tension of the spring 43. The extremities of the grooves 38, 39 and 40 correspond to the arc of the pinion 6 which contains the teeth 9 that intermesh with the teeth 7 of the segment 8 as the segment is rocked by means of the handle 10.

The manipulating features having been referred to, the structure of the valve itself and its relation to the casing 1 will now be described. It has a reduced diameter 19 where it is pinned to the shaft 4. The two ends of the valve body are substantial duplicates of each other. At each end of the reduced diameter full diameter shoulders are formed. At the left end an enlargement 20 and at the right hand end an enlargement 21. The enlargements 20 and 21 at one side of the valve axis have openings 33 and 34 which lead respectively to the bores 26 and 27. These bores besides affording passageways for the air also provide space for the compression springs 28 at the left hand end and 29 at the right end.

Between the enlargements 20 and 21 and the respective ends of the valve body it is flattened as shown in Figs. 18 and 19 in order to form a clear space leading to the exhaust openings, 14 at the left end and 15 at the right end. At right angles to these flattened portions closures are inserted in recesses, at the left end closure 22 and at the right end closure 23. Both of these closures cooperate with the respective casing exhaust openings 14 and 15. Diametrically opposite the closures 22 and 23, smaller sized closures are placed in similar recesses, 24 at the left end and 25 at the right hand end. These smaller closures cooperate respectively with the left hand cylinder opening 16 and the right hand opening 17. The opening 16 is connected to the cylinder 45 and the opening 17 is connected to the cylinder 46. An air inlet 13 through the casing communicates with the portion of the inside of the casing that surrounds the reduced diameter 19 of the valve body. Openings 32 connect the bores 26 and 27 out from the flattened ends. (See Figs. 14 and 16.)

In order that the valve may be balanced I provide miniature openings 30 which lead from the reduced diameter 19 to the bores 26 and 27. Air entering the openings 30 balances the valve body at its ends. The closures 22, 23, 24 and 25 are also balanced by reason of air pressure on their under sides, through openings 31 (Fig. 20). In order that the closures 22—25 inclusive will be held in alignment for free action they are provided with square projections 35 which are seated in corresponding recesses. The openings 31 only admit pressure at the outer ends of the closures and the equalizing pressure for the inner ends is secured through openings 36 in the projections 35 Figs. 21 and 22. These openings lead to four-way openings 36 formed where the projections join the body of the closures.

The reason for the use of the parts 22—23 and 24—25 in Fig. 13 is to have a large external bearing surface, in contrast to the relatively small area of the square portion 34 shown in Figs. 21 and 22. The parts 24—25 of Fig. 13 are the smaller and different parts shown in Figs. 22 and 25.

The operation of my four-way valve is simple. It is quite positive in the results it attains. When the valve is in the central or neutral endwise position shown in Figs. 3 and 11 and at the central rocking position air only passes through the opening 13 into the space around the reduced diameter 19 but as the outlets 16 and 17 are closed by the enlargements 20 and 21 the air cannot escape, hence the pistons 47 are quiescent and the mechanism attached to the pistons 48 or 52 remains inactive.

In the central position, circumferentially, the valve may be moved endwise, to the right against the compression of the spring 29 to its extreme position as shown in Figs. 4 and 13 when air will pass through the opening 17 to the cylinder 46 behind its piston 47 but air will not exhaust from behind the other piston 47 in cylinder 45 through the casing opening 16 and the exhaust outlet 14. This relationship is permitted by the central groove 37, Fig. 23.

When the valve is retained in the same rotary position but is moved to its extreme left end position against the spring 28 the action in the cylinders is simply reversed. The cylinder 45 will now receive air through the opening 16 and the pipe connections therebetween and the cylinder 46 will not be exhausting through the connections to the opening 17 and the exhaust port 15. This position is determined by the groove 37, Fig. 23.

If the valve is to be rocked upward from the groove 37 in the sleeve 5 it can be done only when it is in its extreme position at either end of the casing. This is permitted by the grooves 38 and 39, Fig. 23. If moved to the extreme right shown in Figs. 5 and 14 cylinder 45 may exhaust through openings 16 and 14 but the cylinder 46 may receive air from 13 and 17.

In case the valve is rocked upward when it is in its extreme position to the left, Fig. 7 as determined by the groove 39 the cylinder 45 is receiving air and cylinder 46 is exhausting. The next rocking position is downward, determined by the groove 40. It must first be brought central to the position determined by the depression 41 of the sleeve 5, Fig. 23 when the downward rocking may take place and the valve will assume the position shown in Fig. 8 when both cylinders will be exhausting, cylinder 45 through openings 16 to 33 and the bore 26 and the exhaust opening 14, and cylinder 46 through openings 17 to the other bore 27 and the exhaust opening 15.

When compressed air is first admitted to one cylinder the two pistons are moved so that one is moving outward while the other is moving inward and the latter is compressing the free air in its cylinder and the movement of the pistons will continue until the pressure in both cylinders is the same and any mechanism that is actuated by the movements of the piston will be at rest, held positively against further movement so long as the valve remains in this position. The pressure used may vary widely between high and low as desired.

What I claim is:

1. A four-way balanced valve comprising a unitary body having an annular reduced diameter about midway of its length and a central bore extending inward from each end terminating adjacent the reduced diameter, full diameter shoulders at each end of the reduced diameter, flattened ends of the valve between the shoulders and the valve ends having openings communicating with the central bores, a casing having openings in its walls for the valve, closed ends of the casing, a stem to which the valve is attached movable through the casing ends, and means external of the casing for rocking the stem variably and variably moving it endwise as desired.

2. A casing having removable ends, a valve stem in the casing, a multiported valve on the stem, a compression spring on the stem at each end of the valve abutting the removable ends, a multi-grooved sleeve on an extension of the stem external of the casing, said sleeve having axial and circumferentially connected surface grooves, means for supporting the stem adjacent the sleeve, and means associated with the sleeve for predeterminedly positioning the valve lengthwise of the casing and rocking it on its axis as desired to conform to the selected parts of the casing.

3. A positive control for mechanical devices, which comprises a pair of cylinders, having a piston in each cylinder, a rod in common to both pistons, and connections from the rod to any desired mechanical device, and means external of the cylinders for positively holding the selected device at a minimum intermediate or maximum speed of movement as desired which means include a unitary valve on a single stem, a casing for the valve, closed ends of the casing, a reduced diameter center of the valve pinned to the stem, a spring on the stem in a bore of the valve between a closed end and the pinned center, a similar spring in a similar bore of the valve between such center and the other closed end. enlarged diameter portions adjacent the center fitting in the bore of the casing, extensions adjacent the enlarged diameters having discontinuous circumferences, ports in the enlarged diameters leading to valve bores, separate valved ports in the extensions also leading to the valve bores, cooperating ports in the casing, and means on the stem external of the casing for defining various endwise and rotary positions of the valve in relation to position of coordinate ports in the valve and the casing.

JOHN EVANS.